United States Patent
Evans et al.

(10) Patent No.: US 10,041,027 B2
(45) Date of Patent: Aug. 7, 2018

(54) METHOD FOR AGING OR MATURING ETHYL OR ETHANOL ALCOHOL BASED BEVERAGES

(71) Applicants: Dennis D. Evans, Independence, MO (US); John C. Whitfield, Nashville, TN (US)

(72) Inventors: Dennis D. Evans, Independence, MO (US); John C. Whitfield, Nashville, TN (US)

(73) Assignee: EVANSFIELD DISTILLERY BUSINESS GROUP LLC, Lee's Summit, MO (US)

( * ) Notice: Subject to any disclaimer, the term of this patent is extended or adjusted under 35 U.S.C. 154(b) by 98 days.

(21) Appl. No.: 15/337,143

(22) Filed: Oct. 28, 2016

(65) Prior Publication Data
US 2018/0119076 A1    May 3, 2018

(51) Int. Cl.
C12H 1/22      (2006.01)
C12G 3/07      (2006.01)
B27M 1/06      (2006.01)

(52) U.S. Cl.
CPC ............ *C12H 1/22* (2013.01); *B27M 1/06* (2013.01); *C12G 3/065* (2013.01)

(58) Field of Classification Search
CPC .. C12H 1/22; C12G 3/065; B27M 1/06; A47J 31/06; A47J 31/44
See application file for complete search history.

(56) References Cited

U.S. PATENT DOCUMENTS

| | | | |
|---|---|---|---|
| 2,079,378 A | 5/1937 | Mills | |
| 2,108,661 A | 2/1938 | Farrier et al. | |
| 2,114,009 A * | 4/1938 | Ramsay | C12G 3/065 99/277.1 |
| 2,132,435 A | 10/1938 | Reiman | |
| 2,203,229 A | 6/1940 | Nilsson et al. | |
| RE21,589 E | 10/1940 | Krebs | |
| 2,347,783 A | 5/1944 | Krebs | |
| 2,417,505 A | 3/1947 | Krebs | |
| 2,487,594 A | 11/1949 | Rudnick | |
| 2,876,692 A * | 3/1959 | Gaisman | B65D 1/06 215/261 |
| 3,001,877 A | 9/1961 | Shapiro | |
| 3,021,780 A | 2/1962 | Bobbe | |
| 3,259,055 A | 7/1966 | Labs | |

(Continued)

FOREIGN PATENT DOCUMENTS

| | | |
|---|---|---|
| DE | 102006053858 | 5/2008 |
| GB | 2477308 | 1/2010 |

(Continued)

OTHER PUBLICATIONS

European Patent Office, International Search Report and Written Opinion for PCT/US2017/056171 dated Jan. 8, 2018, Rijswijk, Netherlands.

(Continued)

*Primary Examiner* — Hoa V Le
(74) *Attorney, Agent, or Firm* — Middleton Reutlinger

(57) ABSTRACT

A method and apparatus for aging spirits using a novel wooden medallion, where the method requires selecting a type of wood, washing the wood, roasting the wood, and contacting the wood with an ethyl or ethanol alcohol based liquid product.

33 Claims, 5 Drawing Sheets

(56) References Cited

U.S. PATENT DOCUMENTS

| | | | |
|---|---|---|---|
| 3,842,723 A | 10/1974 | Boucher | |
| 3,942,423 A * | 3/1976 | Herzfeld | C12G 3/065 426/112 |
| 4,073,955 A * | 2/1978 | Koppelman | B01F 7/00016 426/422 |
| 4,558,639 A | 12/1985 | Hojnoski | |
| 4,576,824 A | 3/1986 | Gubiev et al. | |
| 4,792,454 A * | 12/1988 | Lemonnier | C12G 1/064 426/112 |
| 4,813,565 A | 3/1989 | Croser | |
| 5,054,381 A | 10/1991 | DePeaux et al. | |
| 5,102,675 A * | 4/1992 | Howell | C12G 3/065 217/72 |
| 5,174,461 A | 12/1992 | Sullivan | |
| 5,481,960 A | 1/1996 | Sullivan | |
| 5,537,913 A | 7/1996 | Vowles | |
| 5,647,268 A * | 7/1997 | Sullivan | C12G 3/065 99/276 |
| 5,922,389 A * | 7/1999 | Steele | C12G 3/065 426/132 |
| 6,203,836 B1 * | 3/2001 | Gross, II | C12G 3/065 426/422 |
| 6,378,419 B1 | 4/2002 | Ecklein | |
| 6,898,834 B1 | 5/2005 | Warren | |
| 7,063,867 B2 * | 6/2006 | Tyler, III | C12H 1/16 426/237 |
| 7,572,495 B2 | 8/2009 | Atkinson | |
| 7,594,468 B2 * | 9/2009 | Kania | C12G 3/065 426/330.4 |
| 8,381,926 B2 | 2/2013 | Kenealy et al. | |
| 8,889,206 B2 | 11/2014 | Lix | |
| 2003/0157216 A1 | 8/2003 | Plumb | |
| 2005/0031760 A1 | 2/2005 | Plumb | |
| 2005/0084597 A1 | 4/2005 | Wasmund | |
| 2009/0068308 A1 | 3/2009 | Watson et al. | |
| 2010/0092636 A1 | 4/2010 | Watson et al. | |
| 2012/0088018 A1 | 4/2012 | Lix | |
| 2012/0164300 A1 * | 6/2012 | Niazi | C12G 3/065 426/592 |
| 2014/0131303 A1 | 5/2014 | Mulac | |

FOREIGN PATENT DOCUMENTS

| | | | | |
|---|---|---|---|---|
| GB | 2477308 | * | 8/2011 | C12G 3/06 |
| WO | 97/49795 | * | 12/1997 | C12H 1/22 |
| WO | 1997049795 | | 12/1997 | |
| WO | 2010/042707 | * | 4/2010 | C12C 11/00 |
| WO | 2011/053405 | * | 5/2011 | C12G 3/12 |
| WO | 2011/114331 | * | 9/2011 | C12G 3/07 |
| WO | 2011114331 | | 9/2011 | |

OTHER PUBLICATIONS

Barrel Aged Cocktails Without the Barrel Apr. 21, 2016.
We Tried This Wiskey-Enhancing Stick of Wood So You Don't Have to Oct. 17, 2014.

* cited by examiner

METHOD FOR AGING OR MATURING ETHYL OR ETHANOL ALCOHOL BASED BEVERAGES

STATEMENT REGARDING FEDERALLY SPONSORED RESEARCH

None.

REFERENCE TO SEQUENTIAL LISTING, ETC.

None.

BACKGROUND

Present embodiments are related to a method for aging spirits, such as ethyl or ethanol alcohol based beverages. More specifically, present embodiments are related to a method of using a wood medallion or wood substance inside a vessel containing an ethyl or ethanol alcohol based beverage which greatly accelerates the chemical reactions associated with aging as well as the coloring and flavoring of the beverage and significantly reduces the amount of time required to age spirits as compared to the more traditional barrel methods.

Many spirits, such as bourbon, whiskey, tequila, rum, and wine are aged in wood barrels in order to impart flavor and coloring into the spirit. The wood barrels are typically charred in order to aid in the maturation process of the spirit. The charring of the wood breaks down certain components of the wood to be imparted into the spirit and further forms a layer of carbon, which helps rid the spirit of certain impurities. The charring, for example, turns starches in the wood into sugars, which then are caramelized and imparts flavor into the spirit. As the spirit matures in the wood barrel, the wood absorbs and exudes the spirit as the ambient temperature and barometric pressure change. This results in chemical reactions between the spirit and the wood and the spirit taking on the flavors and colors of the wood. Traditionally, this process is carried out in large charred wood barrels and may take several years for the spirit to obtain the desired color and taste. Further, this traditional process may result in a loss of up to five to seven percent of the spirit each year due to evaporation from the wood barrel. This evaporative loss is colloquially referred to as the "Angel's Cut". Once the maturation process is complete, the spirit is transferred out of the barrel into containers to be sold to the public.

The traditional maturation process as described above requires a substantial amount of time to complete before the spirit may be packaged for retail sale. Further, because the barrels are not airtight, impurities may enter the barrel and further oxidation may occur which may negatively affect the color and flavor of the spirit. Additionally, the traditional process does not allow the end consumer to dictate how long the spirit ages or, in other words, the process does not give the end consumer any ability to control the color or flavor of the aging spirit.

Therefore, in light of the negative traits of the traditional spirit aging process, it is desirable to provide an accelerated spirit aging or maturation process. It is further desirable to provide a spirit aging or maturation process that allows for the maturation of a larger volume of spirits with the same amount of wood that is used in the traditional barrel aging process. In other words, it is desirable to provide a process that reduces the amount of wood required. Additionally, it is desirable to provide a spirit aging or maturation process that eliminates the unwanted evaporation of the spirits.

SUMMARY

Accordingly, the present disclosure is directed towards methods and apparatus for aging spirits, such as ethyl or ethanol alcohol based beverages. Generally, in one aspect, a method for aging an ethyl or ethanol alcohol based liquid product is provided and includes selecting wood, wetting the wood, roasting the wood, and contacting the wood with a volume of ethyl or ethanol alcohol based liquid product. The wood may be formed into a desired shape, such as a medallion, a medallion with a hole through the wood forming an opening, wood chips, or pulverized wood. The wood may be formed so as to have a surface area of about fifteen square inches to about seventeen square inches per quart of ethyl or ethanol alcohol based liquid product. The moisture content of the wood may be maintained at at least 15% during said roasting step. The wood may be wrapped, for example with metal foil, prior to the roasting step. The roasting step may include roasting the wood in an oven. The wood and ethyl or ethanol alcohol based liquid product may come into contact with each other in a sealed container, which may be constructed of glass, ceramic, plastic, or metal. The sealed container may further contain a filter for removing solid material from the ethyl or ethanol alcohol based liquid product. The ethyl or ethanol alcohol based liquid product may be whiskey, bourbon, rum, vodka, tequila, cognac, gin, moonshine, or wine. The wood and ethyl or ethanol alcohol based liquid product may have a volume-saturated wood to volume liquid ratio of about 3.85 in$^3$/L. The method for aging an ethyl or ethanol alcohol based liquid product may also include the steps of allowing the ethyl or ethanol alcohol based liquid product to age in a container to form an aged ethyl or ethanol alcohol based liquid product, opening the container, and pouring the aged ethyl or ethanol alcohol based liquid product through a filter, where the filter is located at the opening of the container. Flavors and coloring may also be added to the wood.

Generally, in another aspect, a method of processing wood for use in aging an ethyl or ethanol alcohol based liquid product is provided and includes selecting a type of wood, wetting the wood, wrapping the wood, roasting the wrapped wood, unwrapping the wood, and charring an outer surface of the wood. The wood and ethyl or ethanol alcohol based liquid product may have a volume saturated wood to volume liquid ratio of about 3.85 in$^3$/L. The method may further include the step of forming the wood into a desired wood form, which may have a surface area of about fifteen square inches to about seventeen square inches. The wood form may be chips or pulverized wood powder. The wood form may include a first circular face, a second circular face, an edge, and a hole though the wood, where the hole is an opening between the first circular face and second circular face. The roasting step may include roasting in an oven, and may include maintaining a moisture content of at least 15% during roasting.

In another aspect, a wooden medallion for use in aging an ethyl or ethanol alcohol based liquid product is provided and includes a first circular face and a second circular face, where the first and second circular faces are opposing, an edge, where a thickness measurement of the edge is defined by a distance between the first circular face and the second circular face, a hole, where the hole penetrates through both the first and second circular faces, such that an opening is formed, and a surface area of about fifteen square inches to about seventeen square inches per quart of the ethyl or ethanol alcohol based liquid product. The wooden medallion may be enclosed in a container with an ethyl or ethanol alcohol based liquid product, and the container may be sealed such that said wooden medallion is submerged in the ethyl or ethanol alcohol based liquid product. The container may be glass, ceramic, plastic, or metal. The wooden medallion may be processed before use, where the processing includes the steps of selecting a type of wood, wetting the wood, wrapping the wood, roasting the wrapped wood, unwrapping the wood, and charring an outer surface of the wood.

In another aspect, a method for aging an ethyl or ethanol alcohol based liquid product is provided including the steps of selecting a wood, where the wood selected has a moisture content between about 15% and 100%, roasting the wood, and contacting said wood with a volume of ethanol or ethyl alcohol based liquid product. The wood may be formed into a desired shape, such as a medallion, a medallion with a hole through the wood forming an opening, wood chips, or pulverized wood. The wood may be formed so as to have a surface area of about fifteen square inches to about seventeen square inches per quart of ethyl or ethanol alcohol based liquid product. The moisture content of the wood may be maintained at at least 15% during said roasting step. The wood may be wrapped, for example with metal foil, prior to the roasting step. The roasting step may include roasting the wood in an oven. The wood and ethyl or ethanol alcohol based liquid product may come into contact with each other in a sealed container, which may be constructed of glass, ceramic, plastic, or metal. The sealed container may further contain a filter for removing solid material from the ethyl or ethanol alcohol based liquid product. The ethyl or ethanol alcohol based liquid product may be whiskey, bourbon, rum, vodka, tequila, cognac, gin, moonshine, or wine. The wood and ethyl or ethanol alcohol based liquid product may have a volume-saturated wood to volume liquid ratio of about 3.85 in$^3$/L. The method for aging an ethyl or ethanol alcohol based liquid product may also include the steps of allowing the ethyl or ethanol alcohol based liquid product to age in a container to form an aged ethyl or ethanol alcohol based liquid product, opening the container, and pouring the aged ethyl or ethanol alcohol based liquid product through a filter, where the filter is located at the opening of the container. Flavors and coloring may also be added to the wood.

It should be appreciated that all combinations of the foregoing concepts and additional concepts discussed in greater detail below provided such concepts are not mutually inconsistent are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

In order that the embodiments may be better understood, embodiments of the medallion for use in aging ethyl or ethanol alcohol based beverages and the accompanying process will now be described by way of examples. These embodiments are not to limit the scope of the claims as other embodiments of the medallion and the process will become apparent to one having ordinary skill in the art upon reading the instant description. Non-limiting examples of the present embodiments are shown in figures wherein:

DETAILED DESCRIPTION

Figure 1:
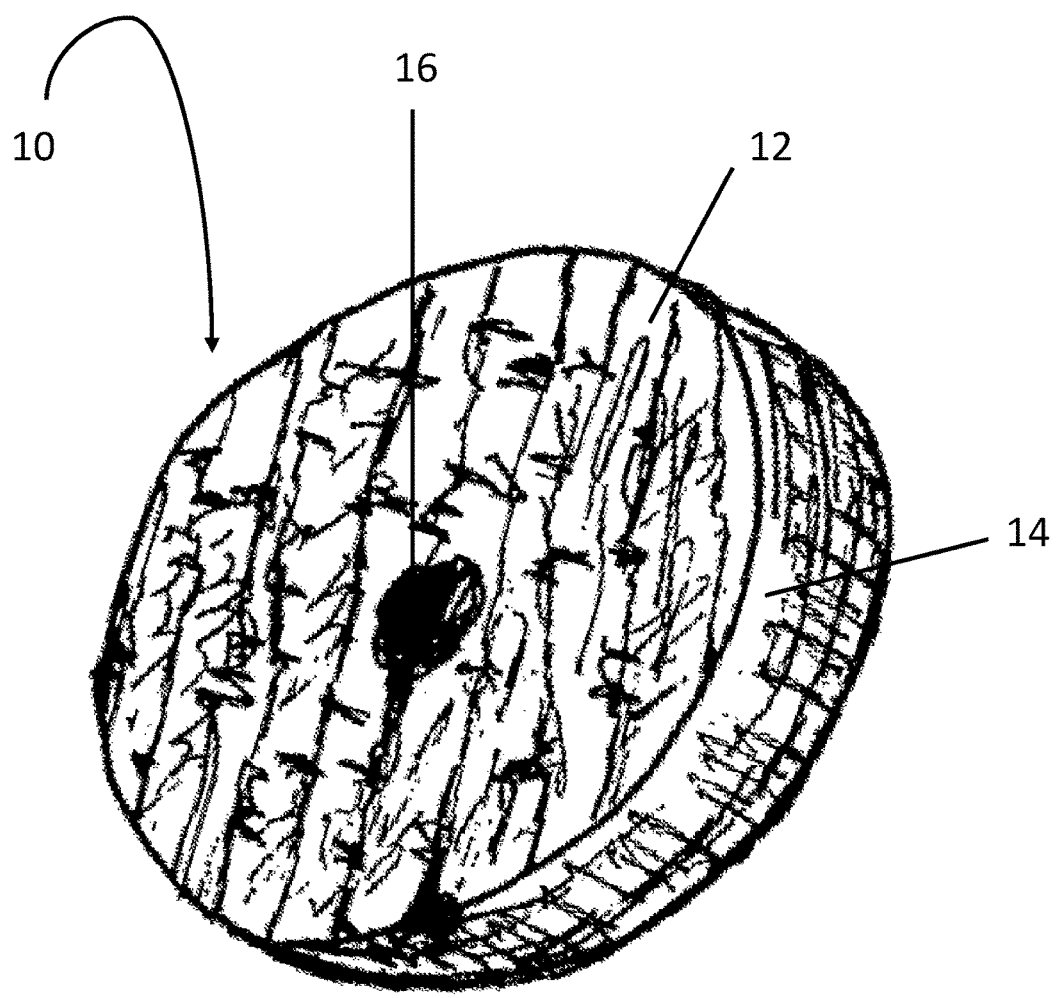
FIG. 1 is a perspective view of an embodiment of the wooden medallion used in the maturation or aging process.

It is to be understood that the spirit aging or maturation process is not limited in its application to the details and the arrangement of components set forth in the following description or illustrated in the drawings. The invention is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there is shown in FIGS. 1 through 5 a method, including the components thereof, for aging or maturing spirits, such as ethyl or ethanol alcohol based beverages. Such a method may dramatically reduce the amount of time required to impart the desired flavor and coloring into the spirit.

Referring initially to FIG. 1, a wooden medallion 10 used in an embodiment of the inventive method as further described herein is shown. The wooden medallion 10 consists of a first circle face 12, a second circle face 12' (not visible in FIG. 1), an edge 14, and a hole 16. The thickness of the edge 14 may be defined by the distance between the first circle face 12 and the second circle face 12'. The hole, or opening, extends through the entire thickness of the medallion, such that liquid may freely flow through the hole. The medallion may be a solid piece of wood or in alternate embodiments may be constructed from multiple pieces of wood. The wood selected to age the spirits may be American oak, French oak, cherry, maple, or any other suitable wood. While the embodiment of FIG. 1 is circular in shape, the medallion is not so limited. Wood for use in the construction and processing of medallions is typically pre-dried with a moisture content of approximately 15% or less. The wood medallion preparation begins with its geometry, which requires particular attention to the surface area to volume ("SA/V") ratio of the medallion to the liquid spirit. With respect to traditional wooden barrels, the SA/V ratio is the amount of surface area of a barrel that is in contact with a specified volume of liquid. It is known in the art that the SA/V ratio of the barrel to the liquid spirit is an important variable for determining the rate of wood extraction from the barrel into the spirit. A traditional 200 L oak barrel has a SA/V ratio of approximately 90 cm$^2$/L.

In order to calculate the SA/V ratio for the wooden medallion 10 of FIG. 1, the surface area of what would be the face of the hole sides must be subtracted from the total medallion surface area, while the surface area inside the hole must be added. The following equation represents this calculation, where D is the outer diameter of the medallion, d is the diameter of the hole, and t is the thickness of the medallion:

$$2(\pi D^2/4)+\pi D*t-2(\pi d^2/4)+\pi d*t \qquad \text{Equation 1}$$

In an example embodiment, a wooden medallion used in the inventive method may have a two and a half-inch diameter, a hole in the center with a quarter inch diameter, and be three-quarters of an inch thick. Using Equation 1, the surface area of the medallion is 16.2 in$^2$, or 104.5 cm$^2$. In this embodiment, the volume of spirits may be approximately one quart (or 0.946L), which would provide a SA/V ratio of about 111 cm$^2$/L, a SA/V ratio approximately 1.2 times that of a traditional 200 L barrel. In another embodiment, the volume of spirits may be approximately 750 ml (or 0.75 L), which would provide a SA/V ratio of 139.3 cm$^2$/L, a SA/V ratio approximately 1.5 times that of a traditional 200 L barrel. For a wooden product formed in the shape depicted in FIGS. 1-4, it is preferred, although not limiting, that the surface area to volume ratio be 111 cm$^2$/L. It is to be understood that the example embodiment is not to be limiting, that the size and shape of the medallion and volume of liquid may be adjusted in order to obtain a desired SA/V ratio. It may be desirable for the medallion to be placed in a particular volume of spirits, for example 750 ml, a common volume used in the spirit industry for consumer purchases. In such instances, the size of the medallion may require adjustment in order to obtain a desirable SA/V ratio. While the medallions may be of various sizes, preferably they are sized to between approximately 0.75 inches and 1 inch thick, have a hole between approximately 0.25 inches and 0.3875 inches in diameter, and provide between 15 and 17 square inches of surface area per quart of distilled spirit. In some embodiments, the wood may be in the form of a pulverized powder.

Additionally, or alternatively, it may be desirable to examine a volume-saturated wood to volume ratio. In particular, this may desirable where the wood has been formed into a pulverized powder, making a surface area to volume ratio more difficult to calculate. For a wooden barrel, the volume of saturated wood is determined by multiplying the barrel surface area by the depth the liquid penetrates. For example, where a barrel has a surface area of 2790 in$^2$ (for a standard 200 L barrel) and the liquid penetrates 0.236 in into the wood, the volume of saturated wood would be 658.4 in$^3$. The ratio of the volume of saturated wood to the volume of liquid for a standard 200 L barrel would be 658.4 in$^3$/200 L, or 3.29 in$^3$/L. The volume-saturated wood to volume ratio for wood formed as described herein may be calculated similarly. For example, where the wood is entirely submerged of saturated, the volume is calculated as a cylindrical volume minus the volume of the hole, if any. Using the dimensions of the medallion described previously submerged in one quart of liquid, the volume-saturated wood to volume ratio would be 3.85 in$^3$/L. For a wooden product formed in the shape depicted in FIGS. 1-4, it is preferred, although not limiting, that the volume-saturated wood to volume ratio be 3.85 in$^3$/L.

Figure 5:
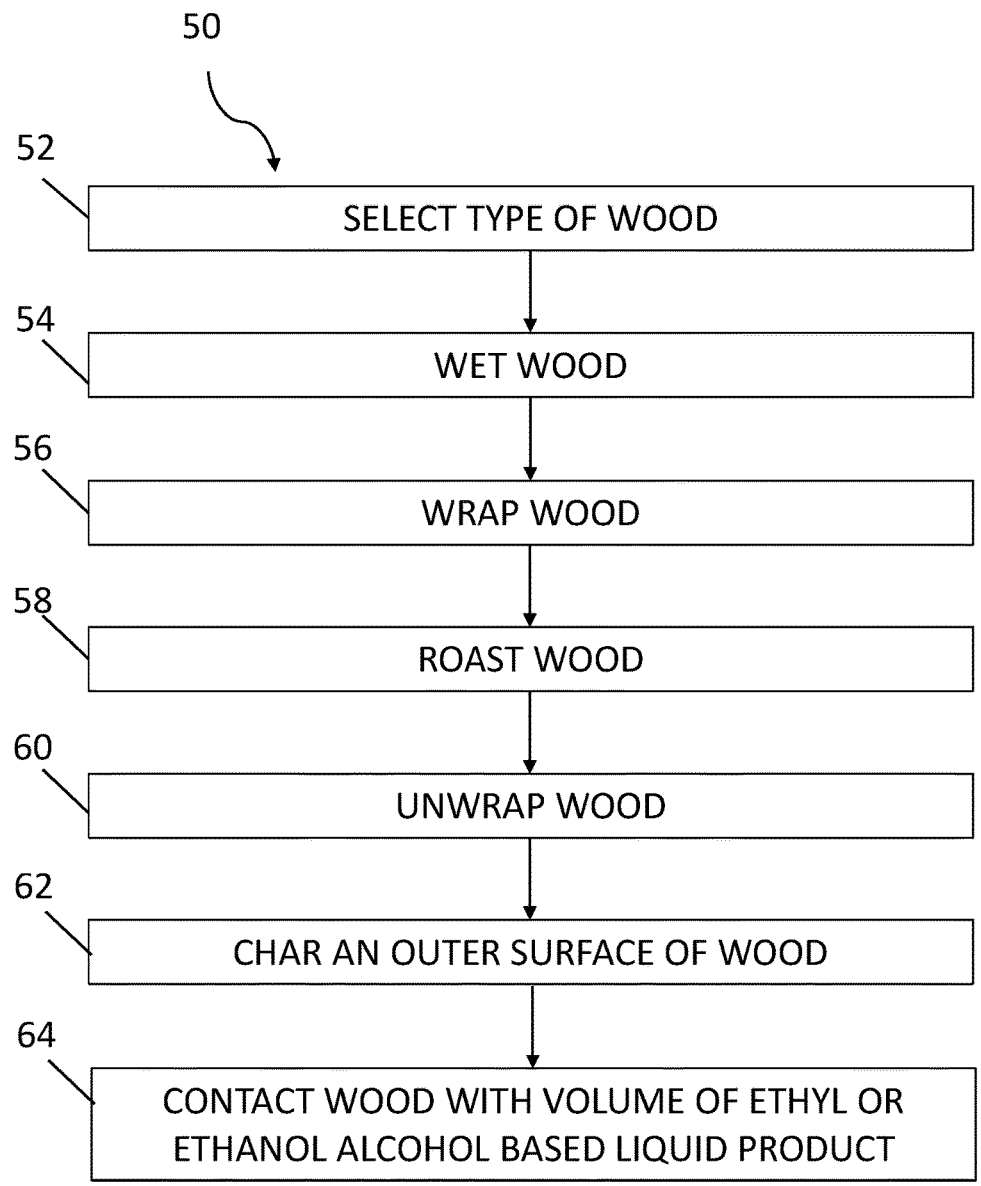
FIG. 5 depicts an example method for making a wooden medallion for use in aging an ethyl or ethanol alcohol based liquid product.

Referring now to FIG. 5, an example method 50 for making a medallion 10 for use in aging an ethyl or ethanol alcohol based liquid product is depicted. While operations of method 50 are depicted in a particular order, this is not meant to be limiting. In various embodiments, one or more operations may be added, omitted, and/or reordered.

At block 52, the type of wood is selected. The wood selected may be American oak, French oak, cherry, maple, or any other suitable wood. The wood may be formed into a desired form. For example, the wood may be in the form of a medallion, wood chips, pulverized wooden powder, and the like. In embodiments utilizing a wooden medallion, the medallion may be formed in a circular shape as described in the embodiment of FIG. 1. In other embodiments, the wood medallion may be formed in other shapes (such as block, pyramid, sphere, and so on) and in various sizes.

At block 54, the wood may be wetted. Since pre-dried wood is preferably used in forming the medallions into their specific geometry, the medallions are processed by wetting them. The wood selected for use may have a moisture content of less than 15%. In some embodiments, this wetting may include washing the medallions in a liquid solution in order to increase their moisture content. This liquid solution may be, for example, water, sugar water, flavored water, juice, candies, oils, oil-based substances, or the like. This process is often referred to as "wood popping," and it helps to raise the grain structure on the surface of the wood. Wood used in traditional barrels must be shaped, which may be done through the use of steam blown through the staves to make them flexible and to allow the staves to be moved into place. This steaming strips away flavors (e.g. sugars) and coloring elements. The forming and processing of the medallions minimizes the amount of handling, which combined with the lack of steaming may allow for better flavor retention in the wood of the medallion.

Alternatively, it also may be possible to achieve the desired results by using wood having sufficiently high moisture contents, so as to eliminate the need for separately wetting the wood. In such embodiments, the wood may not need to be wetted where the moisture content of the starting wood is sufficiently high. For example, where the wood selected for use has a moisture content in the range of about 15% to 100%, the wood may not need to be wetted.

Wood contains various sugars in order to supply the various parts of the tree with nutrients, and these sugars are desirable in the process of aging spirits. As an example, oak trees, which are frequently used in the construction of traditional barrels, have a lower sugar content than other trees, but oak trees also contain tyloses. The tyloses have properties that ensure the waterproofness of the barrel. In traditional spirit aging, the barrel is heated from the inside causing the sugar to be liquefied and the wood to expand, forcing the sugar to come to the surface and caramelize. These caramelized compounds are desirable and are easily dissolved by the raw spirit, thus adding to the flavor profile of the spirit. These caramelized compounds also provide colorant to the liquid. Furthermore, natural and/or artificial flavors or coloring may be used to further enhance the taste and appearance of the final product. For example, the wood may be soaked in natural or artificial compounds prior to or after roasting.

At block 56, the wood medallion may be wrapped, and at block 58 the wood medallion may be roasted. The wrapping and roasting function to increase the transformation of wood properties into sugars. In some embodiments, the wood may be directly wrapped in a metallic foil, for example aluminum foil, a heat resistant plastic, glass mold, and the like. The wrapping of the medallion, for example in a metallic foil, aids in deep heating the medallion during roasting, which helps to breakdown the wood sugars and push them to the surface. Wrapping, for example in the metallic foil, also prevents moisture from escaping the wood too fast, allowing the sugar to move towards the exterior surface of the medallion faster before the temperature reaches the sugar's caramelizing point. Additionally, the wrapping of the wood functions to keep oxygen, or more generally atmospheric air, out. Furthermore, wrapping the medallion, for example in aluminum foil, has the benefits of being impermeable to moisture, an excellent conductor of heat, is odorless and non-toxic, and the foil stays wrapped around the medallion without the need for further sealing. In other embodiments, the wood may be indirectly wrapped. In such embodiments, the wood may be placed in a container, such as a tube, and the container be wrapped. Regardless of the type of wrapping, the wrapping serves to prevent the wood from drying out, which may result in burnt sugars. Therefore, it may be desirable to maintain a certain humidity, for example at least a 15% moisture content. Furthermore, wrapping prevents the wood from being prematurely charred.

After being wrapped, for example in foil, the medallion is roasted to a specific temperature for a specific length of time. In some embodiments, the medallion may be roasted for a time period of about three to about six hours. In other embodiments, the medallion may be roasted for a time period of about four to about five hours. In some embodiments the medallion may be roasted at a temperature of about 200 degrees Fahrenheit, in other embodiments the medallion may be roasted a temperature of about 530 degrees Fahrenheit, and in still other embodiments the medallions may be roasted at any temperature between about 200 and about 530 degrees Fahrenheit. The temperature of roasting may affect the flavor profile of the resulting spirit. In contrast, traditional barrels are toasted on the inside; however, the exact temperature, time, and process varies by distiller and is generally kept as a trade secret. Importantly, the medallions are roasted, or exposed to a dry heat and heated or cooked through to the interior of the wood, such that the sugars, flavors, and the like are brought to the surface from the interior sections of the wood. For example roasting may be done by placing the wood in an oven, microwave, autoclave-pressurized oven, conveyor with a heating element above and/or below. In contrast, traditional barrels are toasted, or browned on the surface of the wood, with a flame, for example by being held over a fire or placed under a dry heat source (e.g. a grill). The wrapped medallions are slowly brought to the desired temperature, in order to allow enough time for sugars and naturally occurring aldehydes, such as vanillin, to be released from the wood.

At block 60 the wood may be unwrapped, and at block 62 the wood may then be charred. This charred layer, similar to those found in traditional barrels, acts as a filter to remove sharp and unwanted flavors from diffusing out of the wood into the liquid. However, over-charring may result in sugars going from being caramelized to burnt, which may cause a bitter taste in the spirit. In order to reduce the amount of bitter flavor diffused into the liquid the depth of the char layer on the wood of the medallion may be minimized. Further, as compared to traditional barrels, the inventive medallion may reduce the amount of surface area charred, which aids in reducing the amount of bitterness in final liquid product. The charring may conclude the process of preparing the medallion, resulting in a processed medallion ready for use in aging the spirit.

The spirit aging process begins when the processed wood medallion is placed in contact with the ethyl or ethanol alcohol based liquid product, shown at block 64. The ethyl or ethanol based liquid product may include, but is not limited to, whiskey, bourbon, rum, vodka, tequila, cognac, gin, moonshine, or wine. In some embodiments, this contact is made inside of a container for the chemical reactions and diffusion of flavoring, colors, etc. of the wood into the liquid spirit, but is not so limited. The medallion is preferably placed into the distilled spirit whole; however, the medallion may be cut into smaller shapes, chips, or pulverized prior to being place into the distilled spirit. The container may be constructed of any material known in the art, for example glass, plastic, metal, ceramic, and the like. Further, the container may be of any size or shape desired. The container is preferably sealed, but the invention is not so limited. It is known in the art that there is a need to expose distilled spirits, for example whiskey, to oxygen in order to facilitate the chemical changes that occur during aging. An embodiment with a breathable container would provide oxygen to distilled spirit. Embodiments utilizing airtight containers may obtain the necessary oxygen from multiple sources. First, the container may be pre-proofed with water, preferably distilled water, and this can provide enough oxygen to act as a catalyst. For example, the proof of the ethyl or ethanol alcohol based liquid product may be between about 80 and about 120 prior to aging. In contrast, in traditional aging processing the spirits begin the aging process with a proof of approximately 120 to 130. Second, the wood of the medallion itself can provide enough oxygen. Third, the unfilled, gaseous space between the liquid and the seal of the bottle can provide adequate levels of oxygen for the chemical process. Oxygen may also be introduced through the use of aquatic oxygen tablets, the use of a bubbler device, or any other method of oxygenation. It should be understood that any of these methods may be used alone or in combination in order to oxygenate the inside of the container.

Figure 2:
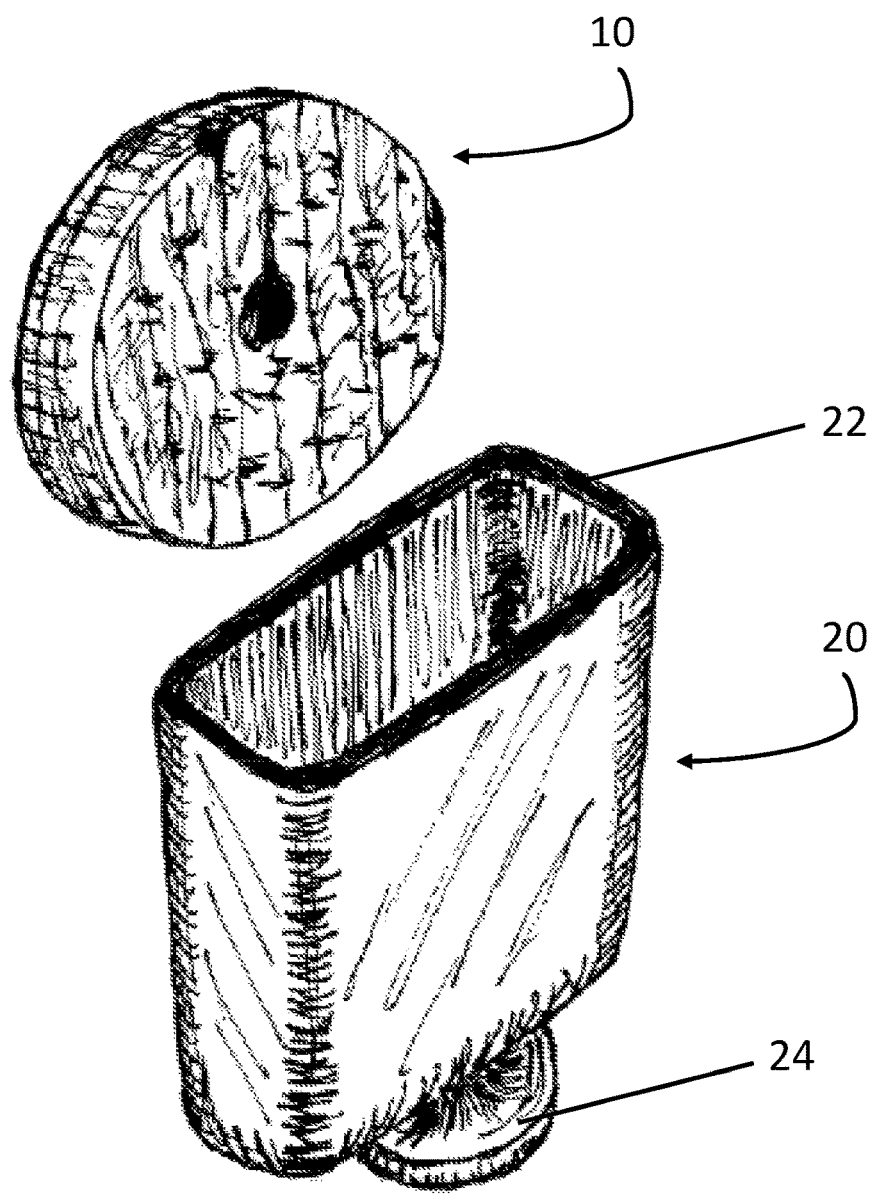
FIG. 2 is a perspective view of the wooden medallion of FIG. 1 being inserted into a container.
Figure 3:
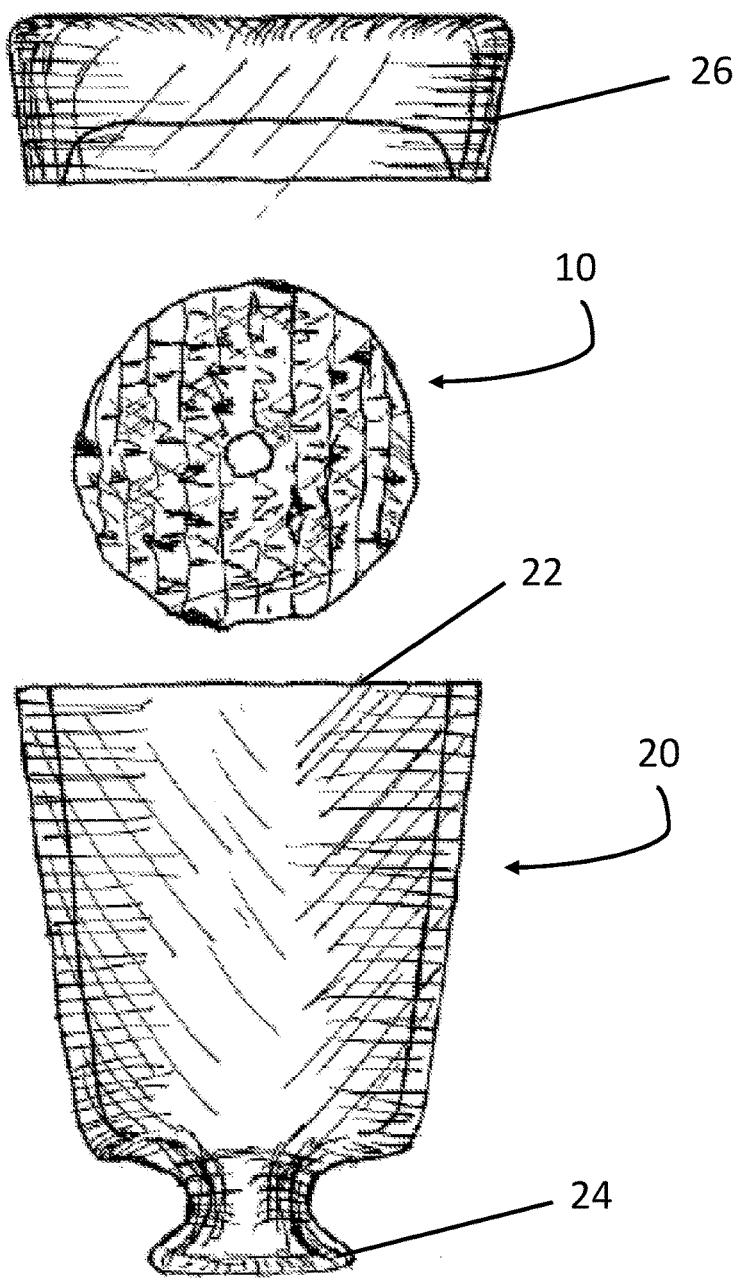
FIG. 3 is a front view of the medallion of FIG. 1 being inserted into the container of FIG. 2.
Figure 4:
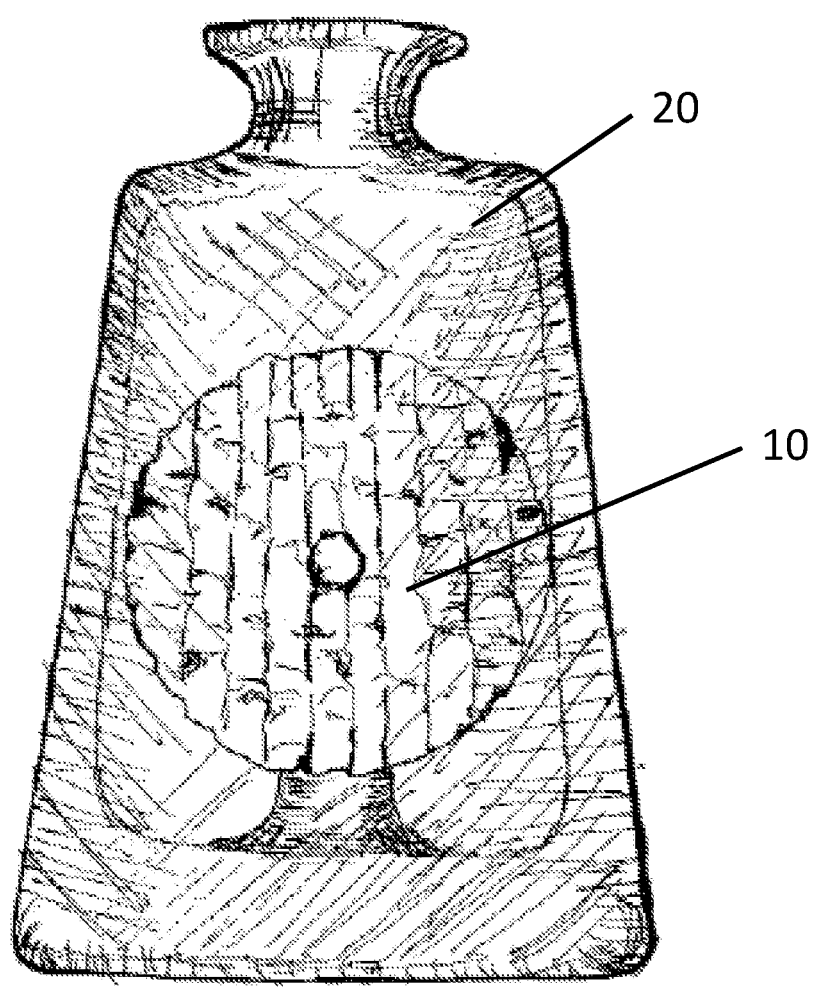
FIG. 4 is a front view of the medallion of FIG. 1 enclosed in the container of FIG. 2.

FIGS. 2-4 illustrate a non-limiting example of the inventive medallion in an airtight container. FIGS. 2-3 illustrate the medallion being inserted into a large opening 22 of the container 20 prior to the container being sealed. In the embodiment illustrated in FIGS. 2-4 the container 20 is inverted with the top of the container 24, which may contain a small opening, positioned downward. The medallion may be inserted into the large opening and another piece 26, for example a bottom, added to seal the container 20. FIG. 4 illustrates the container 20 upright and sealed after the medallion 10 after insertion into the container 20. The container may also include a filter apparatus to filter out any solid materials, such as particles or sediment caused by the wood medallion. In some embodiments, the filter may be placed at the small opening of the container; such that the liquid spirit is filtered before, being poured out of the container, but it is not so limited. The container may be sized so as to hold 750 ml (in addition to the medallion), as this is a volume frequently used in the spirit industry, but the volume is not so limited. Alternatively, the container itself may be designed so as to accelerate the compounds extracted from the wood, including containers that allow application of external or internal pressure on the wood surface.

FIG. 5 depicts an example method 50 for processing wood, for example making a medallion 10, for use in aging an ethyl or ethanol alcohol based liquid product. While operations of method 50 are depicted in a particular order, this is not meant to be limiting. In various embodiments, one or more operations may be added, omitted, and/or reordered.

An airtight container minimizes evaporation of the liquid. This allows for key flavor compounds to remain in the liquid spirit from the distillation process as opposed to being evaporated. In contrast, in traditional barrels, which do not have a perfect seal, evaporation occurs from the expansion and contraction of the barrel staves allowing vapor to escape, at a rate that may be as much as five percent a year. This evaporating vapor is known as the "Angel's Cut" in the distilling industry. By utilizing a wooden medallion in an airtight container, the aging process is not limited by evaporation, as the spirit is aged in a sealed container. Consequently, the aging process can continue as long as the wood medallion is in contact with the spirits, thus creating a unique ability for "Endless Aging".

Additionally, the permeability of traditional barrels also leads to excess oxidation caused by outside air permeating the barrel. This oxidation may impact the taste of the final product due to the unwanted toxins, flavors, environmental pollutants, and other like substances that may diffuse into the barrel, and thus into the spirits contained therein. By utilizing a wooden medallion in an airtight container the chemical composition and flavor of spirit is not altered by the by diffusion of uncontrollable substances from outside of the container.

The wood medallions provide a cost effective and efficient way to age the spirits. A standard 200 L barrel used in the traditional aging process has an interior surface area of approximately 2790 square inches. However, in using the same size barrel but formed into medallions as used in the inventive method disclosed herein, and each medallion having a surface area of approximately 16 square inches, a total of approximately 408 medallions may be formed. As a result, the inventive method can be used to age approximately 386 L of spirit as compared to 200 L in the traditional barrel aging process using the same amount of wood. Additionally, as will be further discussed herein, the use of the medallions as described above greatly accelerates the aging or maturation process.

In the spirits industry it is known that various chemical compounds are demonstrative of the chemical changes found in spirits when aged in a traditional barrel, for example esters, lactones, fatty acids, phenols, aldehydes, and the like. Esters are organic compounds generated by replacing the hydrogen of an acid with an alkyl or other organic group. For example, many naturally occurring fats and essential oils are esters of fatty acids. Lactones are cyclic esters, and oak lactones are key to the aroma imparted by oak barrels. Fatty acid esters are esters resulting from the combination of a fatty acid and an alcohol. Short chain fatty acid esters are known to be produced early in the fermentation process; medium chain fatty acid esters are produced throughout fermentation; and, long chain fatty acid esters are produced mainly at the point of cell death. Phenols consist of a hydroxyl group directly bounded to an aromatic hydrocarbon. For example, natural phenolic compounds may be used in manufacturing of perfumes or flavors. Aldehydes contain a functional group with the structure —CHO, consisting of a carbonyl center, where the carbon atom also bonded to hydrogen and to an R group. Aldehydes contribute to favorable odors found in aged spirits, for example, cinnamldehyde, cilantro, vanillin, and the like.

The inventive medallion and method disclosed herein accelerate the aging process as compared to the use of traditional wooden barrels for producing an aged spirit product, for example whiskey. Gas chromatography-mass spectroscopy ("GCMS") was used to compare the concentrations of commonly observed aging compounds produced from the inventive method and those of various commercially available traditionally aged whiskeys. Aliquots were prepared for GCMS analysis through liquid extraction with methylene chloride (MeCl2). Compound identification performed using NIST 2014 Mass Spectral Identification Library to a confidence level of greater than 80%. Information regarding the instrumentation, software, and operating conditions of the analysis may be found in Tables 1 and 2.

TABLE 1

Instrumentation and Software

| | |
|---|---|
| Gas Chromatograph (GC) | Agilent 7890A GC with 7693 ALS |
| Mass Spectrometer (MSD) | Agilent 5977A with Extractor Ion Source |
| Data Acquisition Software | MassHunter version B.01.07 |
| Data Analysis Software | MSD Chemstation version E.02.02 and NIST 2014 Mass Spectral Library |

TABLE 2

Instrument Operating Conditions

| | |
|---|---|
| Injection Volume | 5 μL |
| Injection Type | Cold Splitless |
| Inlet Conditions | 60° C. hold for 2 min, ramp to 325° C. at 600° C./min, hold |
| Oven Profile | 35° C. hold for 2 min, ramp to 240° C. at 10° C./min |
| Column | Agilent J&W INNOWAX, 30 m x 0.18 mm ID x 0.18 μm film thickness |
| MSD Conditions | EI mode, 70 eV ionization energy; scan 35 amu to 435 amu |

Generally, the results of the GCMS analysis demonstrate that the chemical profiles of commercially available spirits and spirits aged utilizing the inventive medallion and methods are similar. Furthermore, the analysis demonstrated that a week of aging using the inventive medallion and method results in approximately the same chemical composition as a year of traditional aging, two weeks as two years, and so on. Specific compounds and classes of compounds are discussed herein.

Esters, which are formed by secondary reactions between alcohols and organic acids during the condensation process, are present in both unaged and aged distilled spirits. For example, esters may provide a great deal of flavor character to whiskey and are described as adding fruity and flowery flavors to the whiskey. Many different esters and ethyl esters were present in GCMS analysis at varying concentrations. Table 3 includes a list of the esters found in similar concentrations in the spirit aged using the inventive medallion and method and those aged traditionally.

TABLE 3

Esters and Ethyl Esters found in Similar Concentration in Traditionally Aged Spirits and Spirits Aged using the Invention Medallion and Method

| | |
|---|---|
| Octadecanoic Acid, ethyl ester | Octanoic Acid, ethyl ester |
| Hexanoic Acid, Ethyl Ester | Decanoic Acid, ethyl ester |
| Linoleic Acid, ethyl ester | Dodecanoic Acid, ethyl ester |
| Ethyl 9-hexadecenoate | Tetradecanoic Acid, ethyl ester |

Phenols and lactones are among the least volatile compounds analyzed and are largely absent from unaged samples of spirit. Phenolics appear only after distilled spirits come in contact with wood, while lactones appear after contact with white oak, specifically. These two types of compounds are responsible for the unique colors and flavors found in aged spirits. It is known that there may be several mechanisms and sources of these classes of compounds, for example lignins, the breakdown products due to oxidation, pyrolyzed degradation constituents formed during barrel charring, etc. Table 4 provides some major phenolics and lactones found in aged whiskey and their possible sources. These compounds were found in similar concentrations in spirits aged utilizing the inventive medallion and method as well as traditionally aged whiskey.

TABLE 4

Common Phenolics and Lactones Compounds found in Whiskey

| Compound | Possible Source |
|---|---|
| 2-methoxyphenol (guaiacol) | Char layer |
| Eugenol | Extraction |
| Vanillin | Lignin breakdown |
| Syringaldehyde | Lignin breakdown |
| Cis-Oaklactone | Extraction |
| Trans-Oaklactone | Extraction |
| Coniferaldehyde | Secondary reaction |
| Apocynin | Secondary reaction |

Fatty acids may also be prevalent in distilled spirits, both aged and unaged. However, fatty acids were not included in the GCMS analysis because of the relatively poor solubility of fatty acids in methylene chloride and the poor gas-phase chromatographic characteristics of these compounds. However, the GCMS analysis was able to determine the qualitative presence of some fatty acids in both traditionally aged spirits and spirits aged using the inventive medallion and method; these fatty acids are summarized in Table 5.

TABLE 5

Qualitative Fatty Acid Presence in Traditionally Aged Spirits and Spirits Aged using the Invention Medallion and Method

| | |
|---|---|
| Acetic Acid | Octanoic Acid |
| Furfural | Decanoic Acid |
| Hexanoic Acid | Dodecanoic Acid |
| Heptanoic Acid | Tetradecanoic Acid |

The inventive method of aging results in compared results as that of traditional aging by the diffusion of wood/chemicals from the medallion into the distilled spirit as previously discussed. However, due to the inventive medallion and method, acceleration of aging is achieved, such that approximately one week of aging using the inventive medallion and method results in similar chemical properties as commercially available whiskeys aged for one year, two weeks as two years, and so on. Looking at the key compounds such as esters, phenolic, aldehydes, lactones and fatty acids, the inventive medallion and method of aging ages whiskey in the same manner as barrel aging, although at an accelerated rate.

By using the above medallion and method, distillers may immediately bottle the spirit and sell to retailers without having to store and age the spirits for several years. Furthermore, because the aging may be done in the container the spirit is sold in, the end consumer may elect how long they desire to age the spirit. While the inventive medallion and methods of making and utilizing the medallion are described in terms of distilled spirits, it is to be understood the inventive medallion may also be used for aging wine and other ethyl and ethanol based spirts.

The foregoing description of various embodiments of the invention has been presented for purposes of illustration. It is not intended to be exhaustive or to limit the invention to the precise forms disclosed, and obviously many modifications and variations are possible in light of the above teaching. It is intended that the scope of the invention and all equivalents be defined by the claims appended hereto.

What is claimed is:

1. A wooden medallion for use in aging an ethyl or ethanol alcohol based liquid product, the medallion comprising:
   a first circular face and a second circular face, wherein the first and second circular faces are opposing;
   an edge, wherein a thickness measurement of the edge is defined by a distance between the first circular face and the second circular face;
   a hole, wherein the hole penetrates through both the first and second circular faces, such that an opening is formed; and
   a surface area of about fifteen square inches to about seventeen square inches per quart of the ethyl or ethanol alcohol based liquid product.

2. The wooden medallion of claim 1, wherein said wooden medallion is enclosed in a container with an ethyl or ethanol alcohol based liquid product.

3. The wooden medallion of claim 2, wherein the container is sealed such that said wooden medallion is submerged in said ethyl or ethanol alcohol based liquid product.

4. The wooden medallion of claim 1, wherein the container is constructed of a material selected from a group consisting of: glass, ceramic, plastic, and metal.

5. The wooden medallion of claim 1, wherein said wooden medallion is processed before use, said process comprising the steps of:
   selecting a type of wood;
   wetting said wood;
   wrapping said wood;
   roasting said wrapped wood;
   unwrapping said wood; and
   charring an outer surface of said wood.

6. A method for aging an ethyl or ethanol alcohol based liquid product comprising:
   selecting wood in the form of the wooden medallion of claim 1;
   wetting said wood;
   roasting said wood;
   contacting said wood with a volume of ethyl or ethanol alcohol based liquid product.

7. The method claim 6, wherein a moisture content of at least 15% is maintained in said wood during said roasting step.

8. The method of claim 6, the method further comprising wrapping said wood prior to said roasting step.

9. The method of claim 8, wherein said wrapping step includes wrapping said wood with metal foil.

10. The method of claim 6, wherein said roasting step includes roasting said wood in an oven.

11. The method of claim 6, wherein contacting said wood with a volume of ethyl or ethanol alcohol based liquid product is in a sealed container.

12. The method of claim 11, wherein said sealed container is constructed of a material selected from a group consisting of: glass, ceramic, plastic, and metal.

13. The method of claim 11, wherein said sealed container comprises a filter for removing solid material from the ethyl or ethanol alcohol based liquid product.

14. The method of claim 6, wherein said ethyl or ethanol alcohol based liquid product is selected from the group consisting of whiskey, bourbon, rum, vodka, tequila, cognac, gin, moonshine, and wine.

15. The method of claim 6, wherein said wood and said ethyl or ethanol alcohol based liquid product have a volume saturated wood to volume liquid ratio of about 3.85 in$^3$/L.

16. The method of claim 6, wherein the method further comprises:

allowing the ethyl or ethanol alcohol based liquid product to age in a container to form an aged ethyl or ethanol alcohol based liquid product;

opening the container; and pouring the aged ethyl or ethanol alcohol based liquid product through a filter, wherein the filter is located at the opening of the container.

17. The method of claim 6, the method further comprising adding flavors or coloring to said wood.

18. A method of processing wood for use in aging an ethyl or ethanol alcohol based liquid product comprising:

selecting a type of wood in the form of the wooden medallion of claim 1;

wetting said wood;

wrapping said wood;

roasting said wrapped wood;

unwrapping said wood; and charring an outer surface of said wood.

19. A method of claim 18, wherein said wood and said ethyl or ethanol alcohol based liquid product have a volume saturated wood to volume liquid ratio of about 3.85 in$^3$/L.

20. The method claim 18, wherein said roasting step includes roasting said wood in an oven.

21. The method claim 18, wherein a moisture content of at least 15% is maintained in said wood during said roasting step.

22. A method for aging an ethyl or ethanol alcohol based liquid product comprising:

selecting a wood in the form of the wooden medallion of claim 1, wherein the wood selected has a moisture content between about 15% and 100%;

roasting said wood;

contacting said wood with a volume of ethanol or ethyl alcohol based liquid product.

23. The method claim 22, wherein a moisture content of at least 15% is maintained in said wood during said roasting step.

24. The method of claim 22, the method further comprising wrapping said wood prior to said roasting step.

25. The method of claim 24, wherein said wrapping step includes wrapping said wood with metal foil.

26. The method claim 22, wherein the roasting step includes roasting said wood in an oven.

27. The method of claim 22, wherein contacting said wood with a volume of ethyl or ethanol alcohol based liquid product is in a sealed container.

28. The method of claim 27, wherein said sealed container is constructed of a material selected from a group consisting of: glass, ceramic, plastic, and metal.

29. The method of claim 27, wherein said sealed container contains a filter for removing solid material from the ethyl or ethanol alcohol based liquid product.

30. The method of claim 22, wherein said ethyl or ethanol alcohol based liquid product is selected from the group consisting of whiskey, bourbon, rum, vodka, tequila, cognac, gin, moonshine, and wine.

31. The method of claim 22, wherein said wood and said ethyl or ethanol alcohol based liquid product have a volume saturated wood to volume liquid ratio of about 3.85 in$^3$/L.

32. The method of claim 22, wherein the method further comprises:

allowing the ethyl or ethanol alcohol based liquid product to age in a container to form an aged ethyl or ethanol alcohol based liquid product;

opening the container; and pouring the aged ethyl or ethanol alcohol based liquid product through a filter, wherein the filter is located at the opening of the container.

33. The method of claim 22, the method further comprising adding flavors or coloring to said wood.

\* \* \* \* \*